United States Patent [19]

Briley

[11] 4,338,676
[45] Jul. 6, 1982

[54] ASYNCHRONOUS ADDER CIRCUIT

[75] Inventor: Bruce E. Briley, Countryside, Ill.

[73] Assignee: Bell Telephone Laboratories, Incorporated, Murray Hill, N.J.

[21] Appl. No.: 167,930

[22] Filed: Jul. 14, 1980

[51] Int. Cl.³ .............................................. G06F 7/50
[52] U.S. Cl. .................................................. 364/786
[58] Field of Search ............... 364/784, 785, 786, 787, 364/788; 307/445, 456, 480, 603, 605

[56] References Cited

U.S. PATENT DOCUMENTS

| | | | |
|---|---|---|---|
| 3,056,552 | 10/1962 | Wagner | 364/786 |
| 3,154,675 | 10/1964 | Homan | 364/786 X |
| 3,244,865 | 4/1966 | Sussenguth, Jr. | 364/786 |
| 3,843,876 | 10/1974 | Fette et al. | 364/786 |
| 3,947,671 | 3/1976 | Geng et al. | 364/786 |
| 3,993,891 | 11/1976 | Beck et al. | 364/787 |
| 4,152,775 | 5/1979 | Schwartz | 364/786 |

OTHER PUBLICATIONS

G. A. Blaauw, *Digital System Implementation*, 1976, Prentice-Hall, Inc., Chapter 2, pp. 58-59.
Y. Chu, *Digital Computer Design Fundamentals*, 1962, McGraw-Hill Book Company, Inc., Chapter 10, pp. 388-390.

Primary Examiner—Jerry Smith
Attorney, Agent, or Firm—P. Visserman

[57] ABSTRACT

An adder circuit for generating a completion signal indicating the completion of adder operation. A detector circuit (103) is connected to the power supply bus (102) of a multistage parallel adder for detecting voltage variations caused by the operation of the adder stages and for generating a completion signal when these voltage variations have ceased to occur for a predetermined period of time.

10 Claims, 3 Drawing Figures

ASYNCHRONOUS ADDER CIRCUIT

TECHNICAL FIELD

This invention relates generally to logic circuits and, more particularly, to asynchronous adder circuits.

BACKGROUND OF THE INVENTION

Logic circuits, such as multistage parallel adder circuits used for the addition of multiple-bit binary numbers, are well known in the art. Typically, in parallel adders, all bits of two binary numbers are applied to the input terminals of the adder stages in parallel, and each stage generates a sum output signal and a carry signal. For each stage, other than the first stage, both the sum and the carry signals are functions of the values of the input bits and the carry signal received from the preceding stage. Thus, the sum output signals do not represent a steady state condition until carry propagation has been completed through all stages.

One use of the parallel adder is in the so-called synchronous mode, in which the adder sum is not used until sufficient time has elapsed to guarantee carry completion. In another mode of operation, the so-called asynchronous mode, the completion of the add operation is determined by detection of completion of carry propagations. One prior art arrangement generates not only the carry, but also the not-carry signal for each adder stage and uses carry complete logic circuitry to generate a completion signal when either a carry or not-carry signal is received for each stage. However, this prior art adder suffers from the problem of requiring complex carry complete logic circuitry, which increases in size and complexity as the number of binary number bits increases.

SUMMARY OF THE INVENTION

In accordance with this invention, the completion of logic operation in a logic circuit, which causes voltage variations on its power supply bus, is detected by a detector circuit connected to the power supply bus, which detects the voltage variations and which generates a completion signal after the voltage variations cease to occur. In one illustrative embodiment, the logic circuit includes cascaded transistors connected between the power supply bus and ground. During logic circuit operation, the cascaded transistors tend to momentarily cause low impedance paths between the power supply bus and ground, causing significant voltage variations on the power supply bus. In the presence of significant voltage variations on the bus, the detector output signal changes state, and in the absence of significant voltage variations for a predetermined period of time, the detector output signal returns to an initial state. The logic circuit may be a multistage asynchronous adder and the detector output signal may be utilized to indicate the completion of an adder operation.

In accordance with one aspect of the invention, the detector circuit comprises a first switching comparator for detecting significant voltage variations which exceed a predetermined magnitude. A timing capacitor is charged when no significant variations are detected and is discharged upon the occurrence of each detected variation. A second switching comparator generates a high voltage level output signal when the charge on the capacitor is below a reference level and a low voltage level output signal, indicating completion of logic operations, when the charge on the capacitor exceeds the reference level.

Advantageously, the circuit arrangement in accordance with this invention provides an inexpensive and uncomplicated circuit arrangement which senses significant voltage variations, caused by adder operation, to generate an output signal indicating the completion of adder operation.

BRIEF DESCRIPTION OF THE DRAWING

The invention may be better understood from the following detailed description when read with reference to the drawing in which.

DETAILED DESCRIPTION

Figure 1:
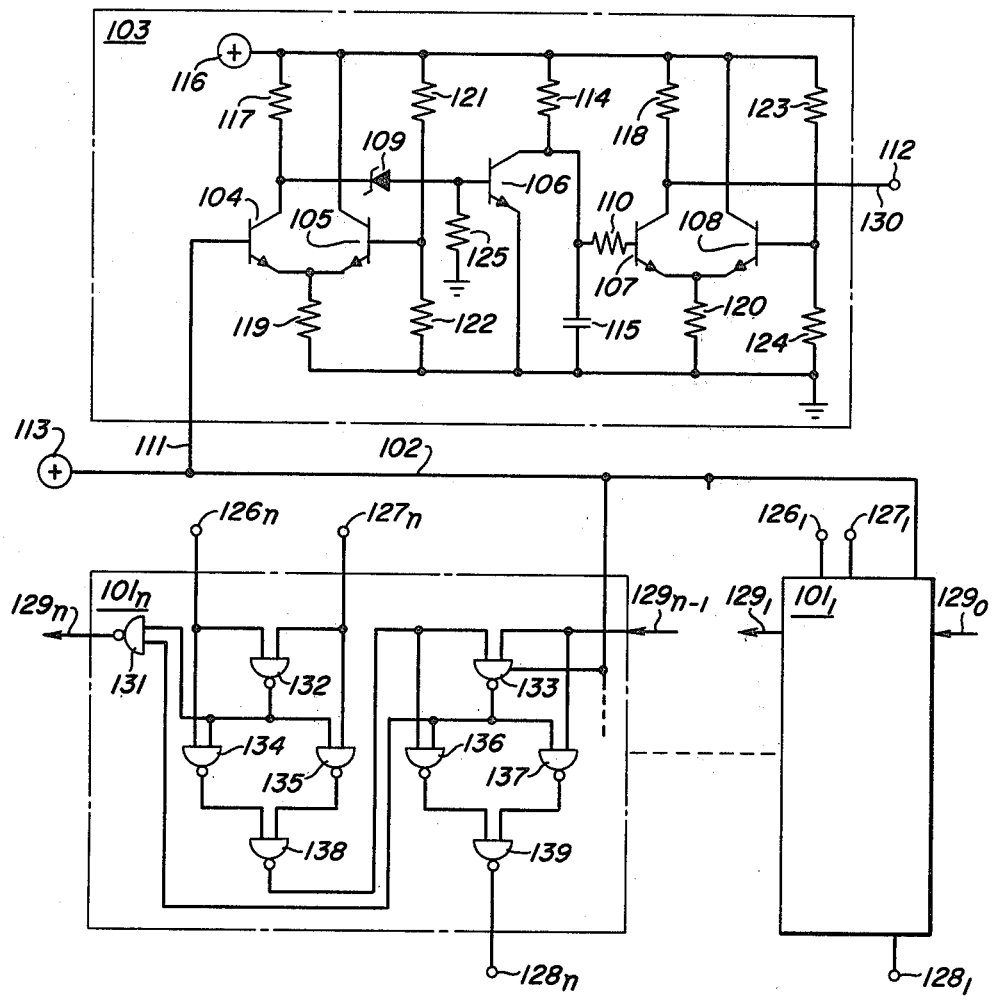
FIG. 1 represents an illustrative embodiment of an adder circuit in accordance with this invention.

FIG. 1 depicts an illustrative adder circuit as including an adder having a plurality of adder stages $101_1, \ldots 101_n$ connected to a common power supply bus 102. During adder operation, the logic circuit activity in any of the adder stages $101_1, \ldots 101_n$ will cause significant voltage variations to occur on bus 102. A detector circuit 103 connected to bus 102 detects these voltage variations and, when these voltage variations cease to occur for a predetermined period of time, generates an output signal indicating that adder operation has been completed. Detector circuit 103 includes an input stage comprising a switching comparator circuit having two emitter-connected NPN transistors 104 and 105, an intermediate stage comprising a resettable timing circuit having NPN transistor 106, and an output stage also comprising a switching comparator circuit having two emitter-connected NPN transistors 107 and 108. The input stage is connected to the intermediate stage, which in turn is connected to the output stage. An input signal, which is the voltage on bus 102, is applied to the base of input stage transistor 104 via input conductor 111. The output signal of detector circuit 103 is generated on an output terminal 112 connected to the collector of output stage transistor 107 via output conductor 130. The output signal assumes a low logic level when no significant voltage variations have occurred on bus 102 for the predetermined period of time. It assumes a high logic level when a significant voltage variation occurs on bus 102 and is maintained at that level for at least the predetermined period of time after the occurrence of the voltage variation. If any subsequent significant voltage variation occurs while the output signal is at the high logic level, the actual period that the output signal is maintained at the high logic level is either extended or re-extended for the same predetermined period of time measured from the occurrence of each subsequent significant voltage variation. When maintained at the high logic level, the output signal may be used to inhibit other logic circuitry from using an incomplete sum signal generated by the adder during its operation.

Figure 2:
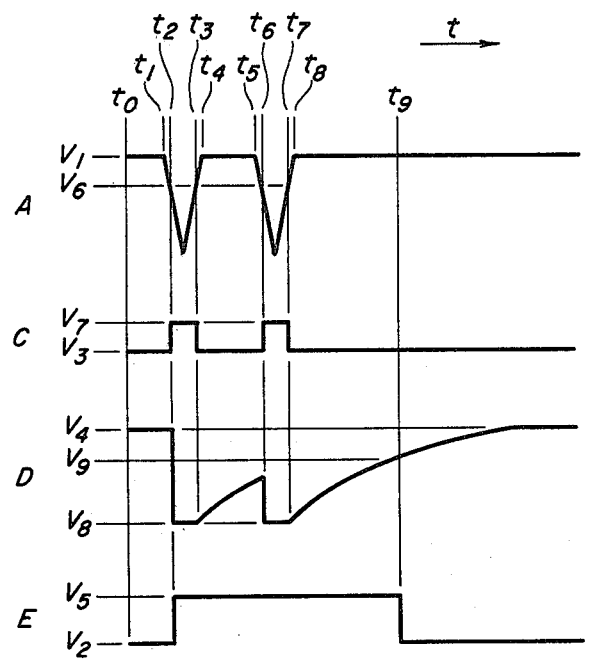
FIG. 2 is a diagram of idealized voltage waveforms, plotted with respect to time, depicting graphically certain of the operations of the detector circuit 103 of FIG. 1.

The operation of the detector circuit 103 of FIG. 1 may be better understood with reference to the diagram of FIG. 2. Shown in FIG. 2, adjacent to designation A, is a graphical representation of an input signal A with idealized voltage variations occurring on bus 102, plotted with respect to time. Without voltage variations, input signal A has a voltage level $V_1$, for example, 5 volts, which is the voltage level of a first positive voltage source 113 connected to bus 102. Although only two idealized voltage variations are depicted for input signal A in FIG. 2, between times $t_1-t_4$ and $t_5-t_8$, it will be appreciated that during adder operation any number of voltage variations having various magnitudes and durations, for example, of 1 to 2 nanoseconds, may occur aperiodically on bus 102.

At time $t_0$, as shown in FIG. 2, no significant voltage variations have occurred on bus 102 for a substantial period of time. With input signal A at voltage level $V_1$, input stage transistor 104 is conducting current, and its collector is at a low level voltage, for example, 6 volts. This voltage level depends on the voltage level of a second positive voltage source 116, which may be, for example, 10 volts, and on the values of collector load resistor 117 and emitter load resistor 119. The collector of transistor 104 is connected to the base of intermediate stage transistor 106 through voltage shifting zener diode 109. Zener diode 109 is maintained at its nominal breakdown voltage by a current path through resistor 125 connected to the base of transistor 106. With a voltage drop of, for example, 5.7 volts across zener diode 109, the base of transistor 106 is at a low voltage level $V_3$, for example, 0.3 volts. A graphical representation of a signal C, which is the voltage on the base of transistor 106, is depicted in FIG. 2, adjacent to the designation C. With signal C at low voltage level $V_3$, transistor 106 is cut off, and its collector is at a high level voltage, for example, 9.7 volts, depending on the value of collector load resistor 114. The collector of transistor 106 is connected to the base of output stage transistor 107 through limiting resistor 110. With a voltage drop of, for example, 4.2 volts across limiting resistor 110, the base of transistor 107 is at a high level voltage $V_4$, for example, 5.5 volts. A graphical representation of a signal D, which is the voltage on the base of transistor 107, is depicted in FIG. 2, adjacent to the designation D. With signal D at high voltage level $V_4$, transistor 107 is conducting current, and its collector is at a low voltage level $V_2$, for example, 6 volts. This voltage level depends on the values of collector load resistor 118 and emitter load resistor 120. The collector of transistor 107 is connected to output terminal 112 via conductor 130. Hence, output terminal 112 is also at low voltage level $V_2$ at time $t_0$. A graphical representation of an output signal E, which is the voltage on output terminal 112, is depicted in FIG. 2 adjacent to the designation E.

Between times $t_1$ and $t_4$, as shown in FIG. 2, a significant voltage variation of signal A, caused by the operation of one of the adder stages $101_1, \ldots 101_n$, occurs on bus 102. When the voltage level of input signal A drops below a positive reference voltage level $V_6$, signal E on output terminal 112 changes from low voltage level $V_2$ to high voltage level $V_5$, for example, 10 volts. The switching comparator circuit of the input stage includes emitter-connected transistors 104 and 105, the base of transistor 104 being connected directly to bus 102 via input conductor 111. Emitter-connected transistors 104 and 105, commonly known in the art as emitter-coupled logic, are fast enough to respond to the significant voltage variations on bus 102. The input stage switching comparator circuit compares the voltage level of input signal A on the base of transistor 104 with the positive reference voltage level $V_6$ on the base of transistor 105.

When the voltage level of input signal A is greater than positive reference voltage level $V_6$, transistor 104 is in the fully conducting state, and transistor 105 is in the cutoff state. When the voltage level of input signal A is less than positive reference voltage level $V_6$, transistor 104 is in the cutoff state, and transistor 105 is in the fully conducting state. Positive reference voltage level $V_6$, which may be, for example, 4 volts, is established by a voltage divider formed by resistors 121 and 122, one end of each resistor being connected to the base of transistor 105, the other ends of the resistors being connected between second positive voltage source 116 and ground. At time $t_2$, when the voltage level of input signal A drops below reference voltage level $V_6$, transistor 104 is cut off. This causes signal C on the base of intermediate stage transistor 106 to change from low voltage level $V_3$ to a high voltage level $V_7$, for example, 0.6 volts. The circuit is designed such that with signal C at high voltage level $V_7$, the grounded emitter transistor 106 is in the saturated state, and its collector is at a low voltage level, for example, 0.3 volts. Transistor 106 has its collector connected to capacitor 115 and through resistor 110 to the base of transistor 107. When the collector of transistor 106 assumes a low voltage level, capacitor 115 is discharged. Thus, signal D on the base of output stage transistor 107 changes from high voltage level $V_4$ to low voltage level $V_8$, for example, 0.3 volts. The output stage switching comparator circuit, comprising transistors 107 and 108, operates in the same fashion as the input stage switching comparator circuit. At time $t_2$, when the voltage level of signal D on the base of transistor 107 drops below a positive reference voltage level $V_9$ applied to the base of output stage transistor 108, transistor 107 is cut off. As a result, output signal E on the collector of transistor 107 changes from low voltage level $V_2$ to a high voltage level $V_5$, for example, 10 volts. Positive reference voltage $V_9$, which may be, for example, 5 volts, is established by resistors 123 and 124, having a common connection to the base of output stage transistor 108.

At time $t_3$, as shown in FIG. 2, when the voltage level of input signal A rises above reference voltage level $V_6$, input stage transistor 104 is conducting current again, and its collector assumes its previous low voltage level. Hence, signal C on the base of intermediate transistor 106 changes from high voltage level $V_7$ to low voltage level $V_3$, and transistor 106 is cut off. After time $t_3$, with transistor 106 in the cutoff state, capacitor 115 will be charged, and signal D on the base of output stage transistor 107 changes exponentially from low voltage level $V_8$ toward high voltage level $V_4$. However, as long as the voltage level of signal D remains less than the reference voltage $V_9$, output stage transistor 107 is cut off, and output signal E will remain at high voltage level $V_5$. The predetermined period of time that output signal E is to remain at voltage level $V_5$ after the occurrence of a significant voltage variation, is the time it takes signal D to change from low voltage level $V_8$ to reference voltage level $V_9$. Signal D changes at a rate determined by the RC time constant of resistor 114 and capacitor 115 and the level of $V_4$. Hence, the predetermined period of time, for example, 7 nanoseconds, is determined by the RC time constant and $V_4$. It is selected to be greater than the maximum duration of time, for example, 5 nanoseconds, between expected significant voltage variations on bus 102.

Between the times $t_5$ and $t_8$, as shown in FIG. 2, another significant voltage variation caused by the operation of one of the adder stages $101_1, \ldots 101_n$ occurs on bus 102. At time $t_6$, when the voltage level of input signal A again drops below reference voltage level $V_6$, signal C on the base of intermediate transistor 106 changes from low voltage level $V_3$ to high voltage level $V_7$. With signal C at high voltage level $V_7$, intermediate stage transistor 106 is in saturation. Consequently, capacitor 115 is discharged through the collector of transistor 106, and signal D returns to low voltage level $V_8$. Therefore, in effect, the timing mechanism is reset. With signal D still less than reference voltage level $V_9$, output signal E remains at high voltage level $V_5$. At time $t_7$, when the voltage level of input signal A on the base of input stage transistor 104 rises above reference voltage level $V_6$, transistor 104 is conducting current again, and signal C returns to low voltage level $V_3$. After time $t_7$, signal D on the base of output stage transistor 107 changes exponentially from low voltage level $V_8$ toward high voltage level $V_4$. At time $t_9$, shown in FIG. 2, when signal D rises above reference voltage level $V_9$, transistor 107 changes to its conducting state, and output signal E changes from high voltage level $V_5$ to low voltage level $V_2$. After time $t_9$, the voltage level of signal D continues to change exponentially until it reaches high voltage level $V_4$.

As previously described, a significant voltage variation of input signal A between times $t_1$ and $t_4$ causes signal D on the base of output stage transistor 107 to change, at time $t_2$, from high voltage level $V_4$ to low voltage level $V_8$. Thus, output signal E changes from low voltage level $V_2$ to high voltage level $V_5$. At time $t_3$ when the voltage level of input signal A rises above positive reference voltage level $V_6$, signal D starts to change exponentially toward high voltage $V_4$. Before signal D reaches positive reference voltage $V_9$, another significant voltage variation of input signal A between times $t_5$ and $t_8$ causes the timing mechanism to be reset and signal D to return to low voltage level $V_8$ at time $t_6$. At time $t_7$ when the voltage level of input signal A again rises above positive reference voltage level $V_6$, signal D at low voltage level $V_8$ again starts to change exponentially toward high voltage level $V_4$, and output signal E will continue to remain at high voltage level $V_5$ for at least the predetermined period of time, for example, 7 nanoseconds. At time $t_9$ when signal D rises above positive reference voltage level $V_9$, output signal E returns to low voltage level $V_2$ indicating the completion of adder operation. It is to be understood that, if another significant voltage variation of input signal A would occur prior to signal D rising above positive reference voltage level $V_9$, then output signal E would again continue to remain at the high voltage level $V_5$ for at least the predetermined period of time.

The illustrative multistage parallel adder, depicted in FIG. 1, is well known in the art and is commercially available. The adder comprises adder stages $101_1, \ldots 101_n$ having addend input terminals $126_1, \ldots 126_n$ and augend input terminals $127_1, \ldots 127_n$ for receiving addend and augend signals, respectively, from other logic circuitry which may be connected thereto; output terminals $128_1, \ldots 128_n$ which may be connected to other logic circuitry; and carry propagation conductors $129_0, \ldots 129_n$ for propagating carry signals between the adder stages $101_1, \ldots 101_n$. Each of the stages $101_1, \ldots 101_n$ comprises an identical plurality of identical logic gates, for example, NAND gates $131, \ldots 139$ interconnected to form a single adder stage, in a manner well known in the art, and shown by way of example in FIG. 1. Each stage is adapted to add an addend, an augend, and a carry signal and to generate a sum and a carry signal. Since adder stages $101_1, \ldots 101_n$ comprise identical logic gates, only one illustrative logic gate will be described herein.

Figure 3:
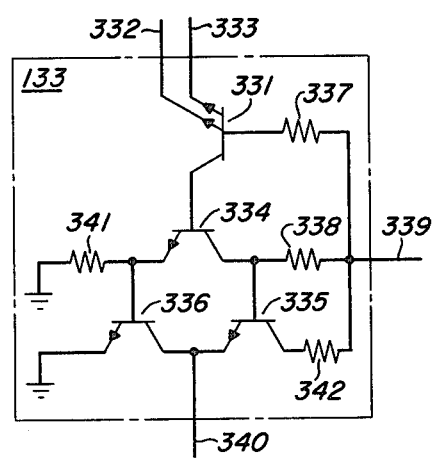
FIG. 3 represents an illustrative TTL NAND gate in accordance with this invention.

FIG. 3 depicts illustrative transistor-transistor logic NAND gate 133 having input leads 332 and 333 and output lead 340. NAND gates of this type are well known in the art and are commercially available. It is characteristic of this gate that with a high logic level on both of input leads 332 and 333, output lead 340 will assume a low logic level, and with a low logic level on either one or both of the input leads 332 and 333, output lead 340 will assume a high logic level. Gate 133 comprises a dual emitter NPN transistor 331 having its two emitters connected to input leads 332 and 333, respectively. The collector of transistor 331 is connected to the base of a second NPN transistor 334 having its collector and emitter connected to the bases of a pair of cascaded NPN transistors 335 and 336, respectively. Transistor 336 has its emitter and base connected to ground, the latter through a resistor 341. The bases of transistors 331 and 335 are connected to a power supply lead 339 through resistors 337 and 338, respectively. The collector of transistor 335 is connected to power supply lead 339 through resistor 342. Output lead 340 is connected to the interconnected emitter of transistor 335 and collector of transistor 336.

The logic circuit of gate 133 is designed so that while either one of cascaded transistors 335 and 336 is in the fully conducting state, the other transistor is in the cutoff state. Specifically, when transistor 336 is in the conducting state, transistor 335 is in the cutoff state, and output lead 340 is at a low logic level. Similarly, when transistor 336 is in the cutoff state, transistor 335 is in the conducting state, and output lead 340 is at a high logic level. However, during a gate state change, when the output lead 340 changes from one logic level to another, a condition may occur in which both of the cascaded transistors 335 and 336 are essentially in the fully conducting state, momentarily providing a very low impedance path from power supply lead 339 to ground. As a result, the voltage level on lead 339, which is connected directly to bus 102, tends to drop sharply for a brief period of time, causing a significant voltage variation on bus 102. Resistor 342 is typically used to limit the magnitude of what heretofore were considered to be troublesome voltage variations. The value of resistor 342 may be selected such that the magnitude of the voltage variations introduced on bus 102 is limited but is sufficiently large to be detected by detector circuit 103. This invention then uses these previously considered undesirable voltage variations to provide a fast and accurate indication of completion of operation of a multistage adder.

Although only one type of detector circuit is described herein, it will be appreciated that other detector circuits may also be connected in a similar fashion to bus 102 to detect the presence of voltage variations thereon. Even though only NPN transistors are used in the adder circuit described herein, it will also be appreciated that PNP transistors or a combination of PNP and NPN transistors, with appropriate changes of voltage levels and polarities, may also be used. Accordingly, what has been described is only one specific illustrative adder circuit according to this invention and it is to be understood that various and numerous other arrangements may be devised by one skilled in the art without departing from the spirit and scope of the invention as limited only by the accompanying claims.

What is claimed is:

1. An electrical circuit comprising:
    a power supply bus (102); and
    logic circuit means (101$_n$) connected to said bus and causing voltage variations on said bus during the performance of logic operations;
    characterized in that
    said electrical circuit further comprises detector means (103) coupled to said bus for detecting said variations and for generating a completion signal indicating completion of said logic operations, after said variations have ceased to occur.

2. An electrical circuit as claimed in claim 1 further characterized in that said logic circuit means comprises a plurality of logic gates (131, . . . 139) interconnected to form an arithmetic circuit for performing arithmetic functions.

3. An electrical circuit as claimed in claim 1 further characterized in that said logic circuit means comprises a plurality of logic gates (131, . . . 139) each including a pair of cascaded transistors (335, 336) connected between said bus and ground whereby said voltage variations are caused on said bus during operation of said cascaded transistors.

4. An electrical circuit as claimed in claim 3 further characterized in that said logic gates are interconnected to form an arithmetic circuit.

5. An electrical circuit as claimed in claim 1 further characterized in that said logic circuit means comprises a plurality of interconnected adder stages (101$_1$, . . . 101$_n$) connected to said bus and said detector means comprises timing means (106, 107, 108, 114, 115) for generating said completion signal a predetermined period after the last of a plurality of said variations has been detected.

6. An electrical circuit as claimed in claim 1 further characterized in that said detector means comprises a detector circuit responsive to said variations when said variations exceed a first predetermined level.

7. An electrical circuit as claimed in claim 6 further characterized in that said detector circuit comprises:
    a first switching comparator circuit (104, 105) responsive to said variations for generating a comparator output signal for each of said voltage variations which exceed said first predetermined level, and
    a timing circuit (106, 107, 108) connected to said first switching comparator circuit for generating said completion signal in the absence of comparator output signals for a predetermined period of time.

8. An electrical circuit as claimed in claim 7 further characterized in that said timing circuit comprises:
    timer means (106, 114, 115) connected to said first switching comparator circuit for generating a timer output signal which exceeds a second predetermined level only when comparator output signals have been absent for said predetermined period of time, and
    a second switching comparator circuit (107, 108) connected to said timer means for generating said completion signal when said timer output signal exceeds said second predetermined level.

9. An electrical circuit as claimed in claim 8 further characterized in that said first and second switching comparator circuits each comprise a pair of emitter-coupled transistors (104–105, 107–108) whereby the emitter of one of the transistors of a pair is coupled to the emitter of the other transistor of the same pair.

10. An electrical circuit as claimed in claim 8 further characterized in that said timer means is reset upon the occurrence of each of said comparator output signals and comprises:
    a transistor (106) having its base connected to said first switching comparator circuit and a capacitor (115) connected to said transistor, and said second switching comparator for generating said timer output signal, said transistor being responsive to said comparator output signals to discharge said capacitor each time a comparator output signal is generated.

* * * * *